INVENTOR
Jacob Rabinow

BY Joseph A. Genovese & Max L. Libman

ATTORNEYS

April 20, 1965 J. RABINOW 3,179,923

SCANNING SYSTEM FOR LARGE AREAS

Filed Oct. 2, 1962 4 Sheets-Sheet 2

INVENTOR
Jacob Rabinow

BY Joseph A. Genovese & Max L. Libman

ATTORNEYS

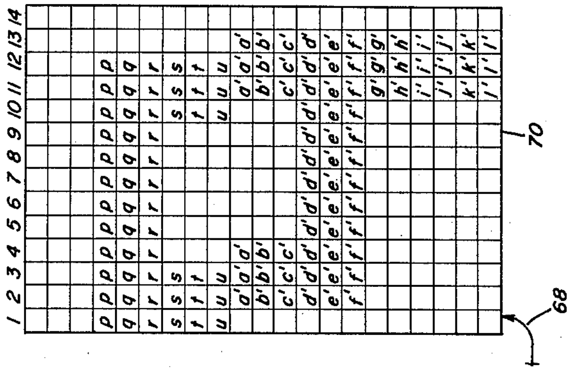
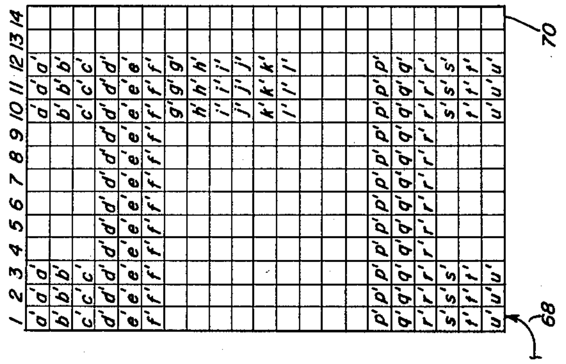
Fig. 6a
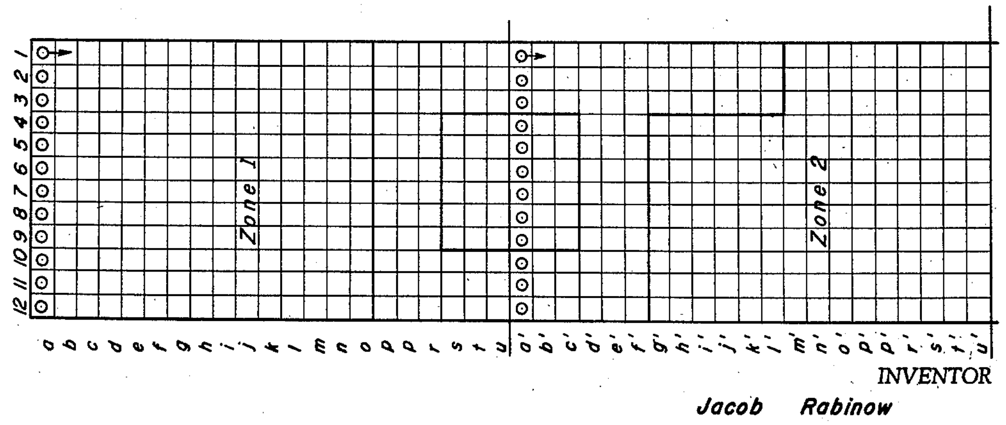
INVENTOR
Jacob Rabinow
BY Joseph A. Genovese & Max L. Libman
ATTORNEYS INVENTOR
Jacob Rabinow
BY Joseph A. Genovese & Max L. Libman
ATTORNEYS United States Patent Office 3,179,923
Patented Apr. 20, 1965

3,179,923
SCANNING SYSTEM FOR LARGE AREAS

Jacob Rabinow, Bethesda, Md., assignor, by mesne assignments, to Control Data Corporation, Minneapolis, Minn., a corporation of Minnesota Filed Oct. 2, 1962, Ser. No. 227,905
5 Claims. (Cl. 340—146.3)

This invention relates to scanning systems and particularly to scanning systems for character recognition machines.

Character recognition machines require scanners to extract character-defining data from the unknown character so that the data may be processed by the reading machine circuits to arrive at the character-identity decision. Character-data extraction can be accomplished by many different kinds of scanners. One of the earliest scanners is the rotating disc. Rotating disc scanners have a number of inherent advantages over other scanners, not the least of which is that they inherently are simple devices.

One of the limitations of a rotary disc scanner when used with (or as a part of) a character recognition machine, is not caused by the disc itself. It is imposed by usual reading machine design, requiring all of the data extracted by the scanner during each scan trace or line, to be stored in a temporary storage device, usually a register. Thus, if a vertical scan line covers an area two or three times the height of the character, the register must be constructed with a capacity of two or three times that actually required to store the character-defining data. Not only is this expensive but it obviously reduces speed and introduces collateral problems such as increased power requirements and complexity in the register.

One way to overcome this problem is to use a minimum capacity register and store character-feature codes. However, this requires considerable logic circuitry between the scanner and the register to encode the scan data into codes representing the various features. Thus, where register-capacity and register costs are reduced by storing feature-codes, there is an offsetting increase due to the necessary logic circuitry to recognize and encode the features.

The above problem would not present itself if there were always exact vertical registration between the scanned area and the character. Then, the register capacity could correspond to the character area. Unfortunately, most reading tasks are not under this kind of ideal condition for reasons well known in the art.

My approach to the above problem enables me to scan a very tall area, for example, two, three or four times the nominal height of the characters, and use a register of a much smaller capacity, i.e., a capacity corresponding to the nominal height of the character. I do this by artificially separating the total scan area into horizontal zones or portions where each zone has its own photocell. To explain the principal, assume that the total scan area is composed of three horizontal zones, i.e., an upper, middle and lower zone. Then, I will have three photocells, with one for each zone. My scanning disc will have the scan elements so arranged that the three zones are simultaneously scanned by three separate (preferably colinear) scan elements. Thus, the scan elements for the three zones will be colinear and they will simultaneously vertically traverse the three zones. Considering the three colinear traversals of the three zones as a single scan line or trace (because, combined, they vertically traverse the entire scan field) all of the available data in one scan trace is extracted by the three photocells in one-third of the time that it would require a single scan element to traverse the total height of the same size scan area in the customary single-photocell system.

Thus, the effect of my arrangement is to simultaneously investigate the three zones of the total area and to obtain scan data from the unknown character regardless of its vertical position in the scan area. In my system, I make certain that the character image height is no greater than the height of one of the zones. Accordingly, the character image can be entirely in one zone or partially in one zone and partially in the adjacent zone. It cannot span more than two zones. Therefore, I can combine the outputs of the three photocells, which has the effect of compressing the height of the total scan area to one-third, thereby requiring a minimal-capacity register.

Accordingly, an object of my invention is to provide a disc-scanning system for a reading area that is considerably taller than the storage capacity of the reading machine, without sacrificing any of the character-defining data extracted from the unknown character by the scanner.

Another object of my invention is to provide a mechanical scan system which is arranged to examine a total area composed of contiguous portions or zones where the contiguous zones are simultaneously crossed by scan elements, and each zone has its photocell. Thus, by combining the photocell outputs, only the actual character area within the larger area composed of the separate zones is represented in the combined output signals from the photocells.

In comparison to other scanning techniques used in reading machines, for instance using a vertical row of photocells, the mechanical disc has a disadvantage because its speed is limited. A speed of 20,000 r.p.m. is considered quite high. If the disc has 60 equally spaced scan apertures, at that speed a given height can be scanned 20,000 times per second. However, with my invention I can scan two, three or more times this height at the same 20 kc. rate (without increasing the speed of the disc) since my scanning system uses two, three (or more) scan apertures simultaneously to examine a corresponding number of contiguous zones which combine to form one scan field or area.

Scanning a large height with a rotary scanning disc, especially a disc of a small diameter, introduces a problem. The holes of an ordinary scanning disc describe arcs as they traverse the scan area. Where the diameter of the disc is large in comparison to the height of the scan area, the fact that each scan hole travels in an arc can be neglected. Since my invention is especially useful in examining large (vertical dimensions) areas, the arcuate path of a hole defining each scan trace should be considered. One way to overcome the problem is to use a drum scanner, but this creates other problems. Another way to cope with the problem is to use radial slots in the disc and a fixed slot perpendicular thereto as shown in U.S. Patent No. 2,877,951. This arrangement provides straightline scan traces but introduces a velocity error because each slot will be moving at a different rate with respect to the fixed slot (because the fixed slot is not on an arc of a circle) as it traverses the fixed slot. Velocity error in a multi-slot scanner can be corrected by the shape of the movable slots, i.e., those in the disc. U.S. Patents Nos. 3,003,064 and 2,912,497 show scanning discs (for other purposes) where the slots are not radial. Upon examination of the geometry involved, it will be seen that the slots in the disc must be curved to yield uniform velocity of the scan element through the complete length of the fixed slot. However, a very good (and usually sufficient) approximation of uniform velocity can be obtained by using tilted straight slots in the disc and they will yield almost uniform velocity of the scan element as it moves across the stationary slot.

Accordingly, another object of my invention is to provide a scanning system for character reading machines where it is desired to cover a comparatively large scan area with scan elements generated by rotation of an apertured disc, and where the traces of the scan element move at or near uniform velocity and in a straight line.

Other objects and features of importance will become apparent in following the description of the illustrated form of the invention which is given by way of example only.

Figure 4:
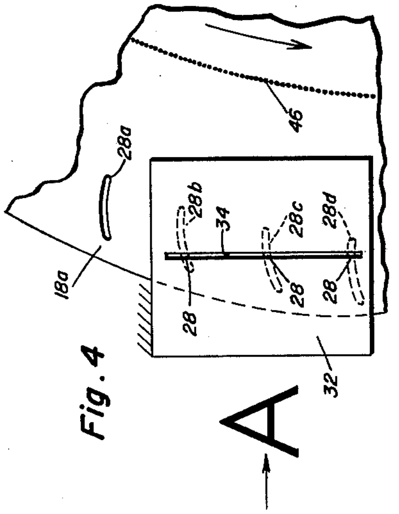
FIGURE 4 is a diagrammatic view showing a method of generating straight-line, constant velocity, scan trace by using a rotary disc.
Figure 4A:
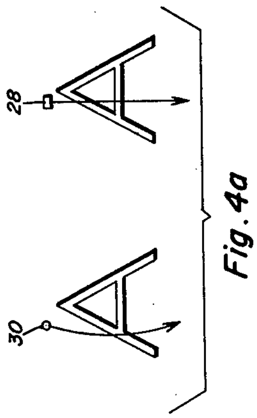

FIGURE 4*a* is a diagrammatic view showing the scan trace of an aperture in a rotary disc and the scan trace of my scan element respectively.

Figure 5:
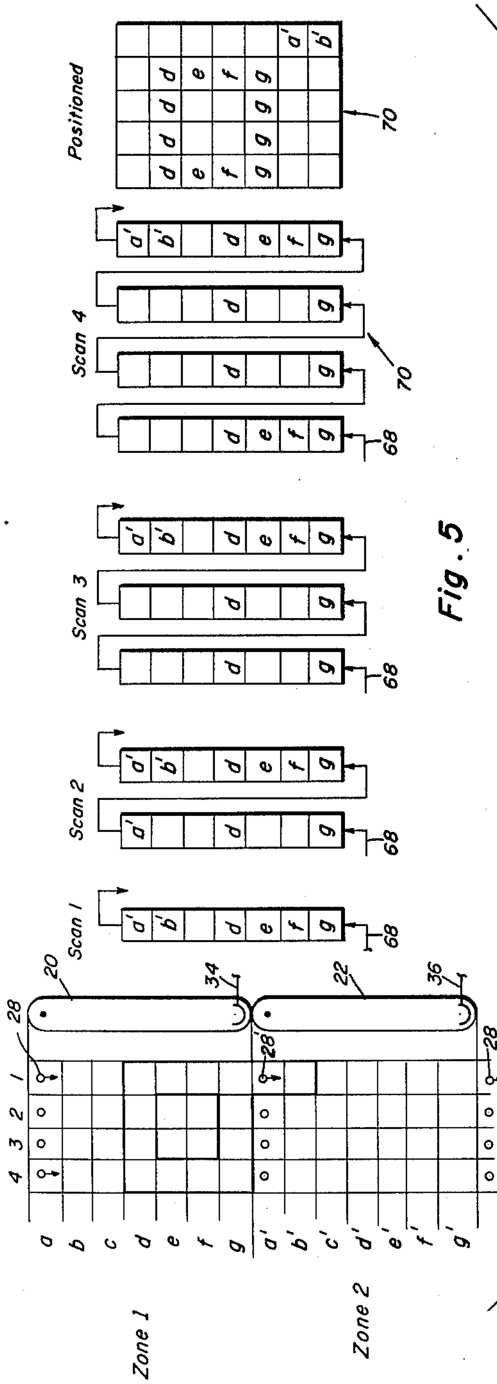

FIGURE 5 is a schematic showing the image of a character projected on two zones of the scan area, and showing how the scan data is loaded into a serial shift register having the capacity only slightly greater than that necessary to store the character image itself.

Figure 6:
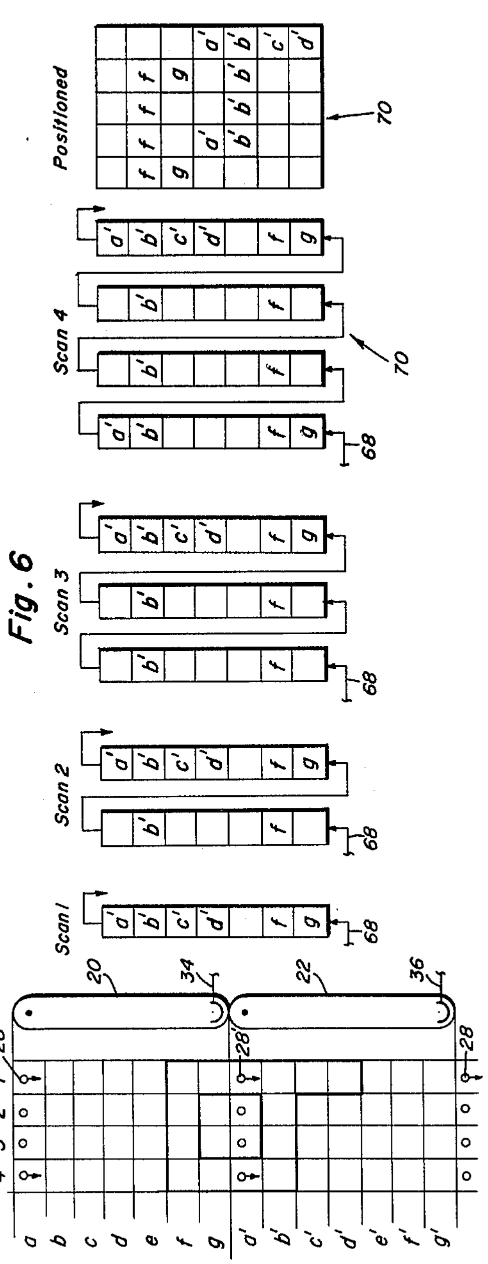

FIGURE 6 is a diagrammatic view similar to FIGURE 5 and showing one of the possible difficulties introduced by my invention where the vertical position of the character image in the scan field will effect the store data in the register.

FIGURE 6*a* is an enlarged diagrammatic view identical to FIGURE 6 but showing the more practical case where the image is scanned with a finer resolution coverage, indicating that the problem encountered in FIGURES 5 and 6 is not actually so acute as depicted.

Figure 7:
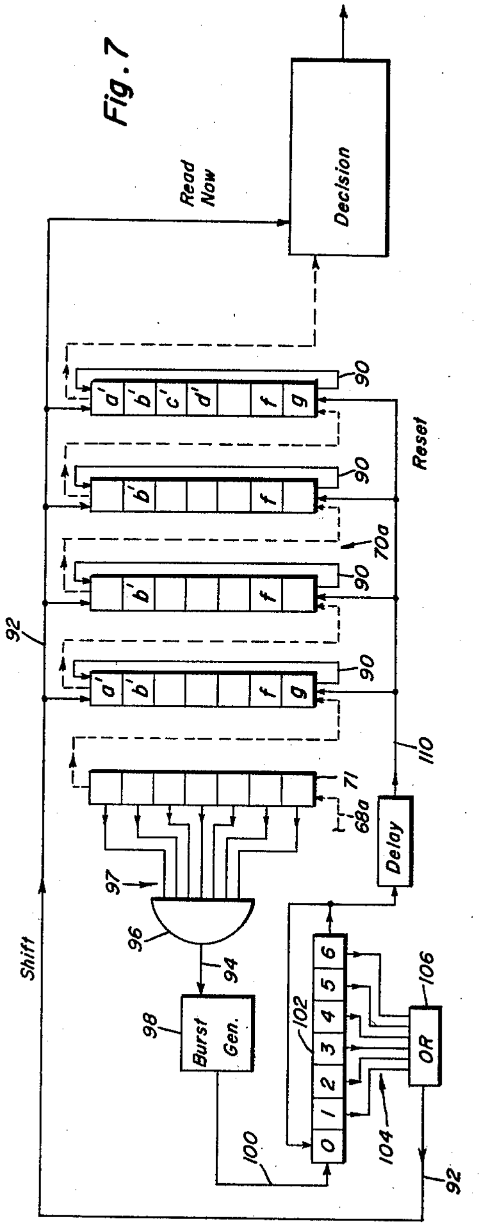

FIGURE 7 is a diagrammatic view showing a modification where the horizontal shear of the character image shown in the registers of FIGURES 5–6*a* may be entirely eliminated by using a bi-directional shift register instead of a pure serial shift register.

Figure 7B:
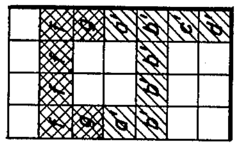
Figure 7A:
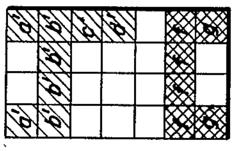

FIGURES 7*a* and 7*b* are diagrammatic views showing information stored in the register of FIGURE 7.

I have previously used and will subsequently use the term "vertical" and "horizontal" to define positions and directions. These terms are used merely as a convenience and are not intended to be limitations. Obviously, my entire scanning system can be turned ninety degrees and what was previously vertical would be horizontal.

Figure 1:
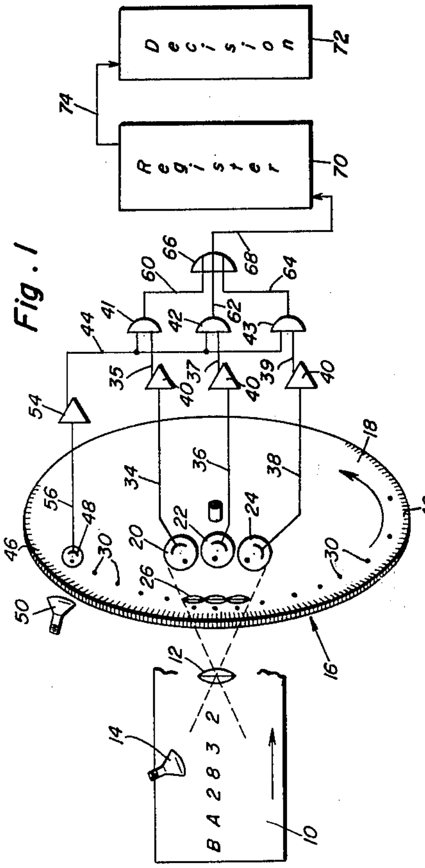
FIGURE 1 is a partially perspective and partially elevational diagrammatic view showing my scanning system in a reading machine.

FIGURE 1 shows a reading machine for the characters on a horizontal document 10. An optical system represented by lens 12 and light source 14 is used to project the images of successive characters onto the image plane of scanner 16. My scanner is composed of a scanning disc 18 operated at a predetermined synchronous speed by means of a motor (not shown). As discussed before, one of the distinguishing features of my invention is that a comparatively tall area on document 10 is scanned, thereby providing appreciable vertical tolerance for "finding" and examining the character on the document, and for allowing a very wide latitude of character printing misregister. Accordingly, my scanning system is well suited for lines of print (or separate characters) having a large amount of space vertically there between. A single line as found on credit cards, titles of books, papers, documents, etc., are excellent examples where my invention is especially useful. Even in those cases where the print is closer together than the normal expectancy, I can easily adjust my scanning system to suit the narrower spacing by using a reflective mask between the document and the optical system to vertically reduce the effective field of view of my scanning system. Alternatively, I could adjust or substitute a narrower angle lens for lens 12.

Figure 2:
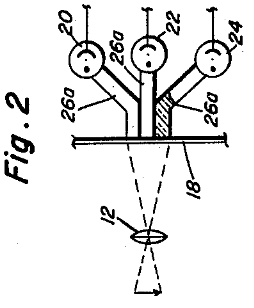
FIGURE 2 is a fragmentary view showing a modification where light pipes are used in place of lenses to conduct the optical scan data to the individual photomultiplier of my scan system.

FIGURE 1 shows three photocells 20, 22 and 24 behind scanning disc 18. Each photocell must be isolated from the others if photomultipliers are used, and therefore I have shown three lenses 26 between the photocells and the rear face of scanning disc 18. Obviously, I could use thin light baffles or light pipes **26*a* (FIGURE 2) in place of or in addition to the lens system 26. If it were not for the fact that photomultipliers (which I prefer because of their gain) are about an inch and a quarter in diameter and this is generally too wide to arrange three of them in a row, as shown, the lenses 26, light pipes 26*a*, or the equivalent, could be eliminated, and the photocells placed very close to the back face of the scanning disc. Regardless of the light-piping arrangement (FIGURE 1 or FIGURE 2 or other equivalent arrangements) the photocells are so arranged that they service individual zones (FIGURE 3) or portions of the total scan area. Each of the three zones is an artificial subdivision of the total-scan area traversed by each scan element 28**. I define a scan element as an aperture or "window" which vertically traverses (either up or down) the total scan area, and the aperture can be formed in a number of ways.

FIGURE 1 shows scanning disc 18 with a plurality of circular holes 30 uniformly spaced in a circular arrangement. As described before, a comparatively small diameter disc moves the holes in an arcuate path instead of a straight line path (FIGURE 4*a*), and the curvature can introduce significant errors in the reading machine logic circuitry, especially when scanning through a rather large arc of disc-rotation. Therefore, I prefer to have the image of the unknown character projected onto the face of a flat panel 32 (FIGURE 4) having a straight vertical slot 34 therein. My scanning disc **18*a* preferably has curved slots 28*a*, 28*b*, 28*c*, etc. which moves behind panel 32 to generate a straight line, constant velocity scan line produced by scan element 28** (FIGURE 4*a*).

Figure 3:
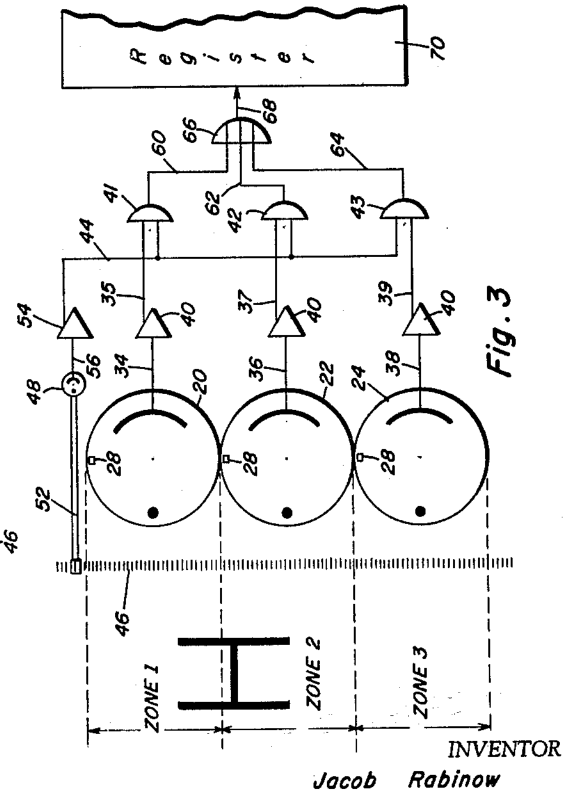
FIGURE 3 is a diagrammatic view showing the three contiguous zones which are arranged to form a scan area which is considerably taller than the character projected thereon.

As shown in FIGURE 3 the height of the character image is slightly smaller than the height of one zone of the total scan area. Thus, the unknown character can appear in any one of the three zones or it can appear partially in one zone and partially in an adjacent zone. This is for an embodiment of my invention where I subdivide the total scan area into three zones. If I use only two zones (FIGURE 5) the relative vertical dimensions of the zones and the characters are the same, so that the character could appear in either zone or could be split partially in one zone and partially in the other. The scan elements 28 (FIGURES 3, 5 and 6) are so spaced that they occupy corresponding places in each of the zones. In other words, when a scan element enters the top of the first zone, other scan elements 28 enter the tops of the second and third zones. Accordingly, three elements colinearly vertically traverse the three zones to generate one scan line or trace. As a result, the photocell outputs on lines 34, 36 and 38 are available simultaneously during a single scan line, and the individual outputs are amplified at 40 and clocked simultaneously at gates 41, 42 and 43. Lines 35, 37 and 39 which are the output lines of the three amplifiers 40, form one input to the respective gates 41, 42 and 43, and the other input to each gate is taken from a clock pulse bus 44 which is a conductor of clock pulses. The clock pulses can be made available from an oscillator or can be taken directly from the disc 18 or **18*a*, for instance by having holes or slots 46 uniformly spaced at a convenient place on the disc and using a photocell 48 (FIGURES 1 and 3) and light source 50 to obtain the necessary clock pulses. As shown in FIGURE 1, the photocell 48 is placed on one side of the disc and light source on the other. FIGURE 3 shows a modification where it is inconvenient to have the photocell 48 so arranged, in which case the light pipe 52 is used as shown. Photocell 48** has an amplifier 54 in its output line 56, and the amplifier output line is attached to bus 44. The purpose of the clock pulses is to provide sampling points along each scan line by providing clock pulses to gates 41, 42 and 43 in time with the rotation of disc 18 or 18*a*. In a digital system such as is shown, it is preferable to use quantizers with amplifiers 40 or to have the quantizer built in each of the amplifiers. Thus, at the time of each sample (clock pulse) along a scan trace, the scan data signals on the gate output lines 60, 62, 64 (described below) are either "black" (i.e., positive) representing a part of the character, or "white" (i.e., negative) representing a part of the character background.

To load register 70, the output signals from gates 41, 42 and 43, on lines 60, 62 and 64, are OR gated at 66. The output line 68 from OR gate 66 is operatively connected with the conventional serial register 70 in one embodiment of my invention (FIGURE 1), and a decision section 72 of any suitable design, is operatively connected with the register by means of conductors in cable 74. The specific connections between register 70 and the decision section 72, and the actual construction of the decision section may be selected from the prior art or from the corresponding disclosure in Patent No. 3,104,369 of Rabinow et al.

A serial shift register has a number of advantages over multi-direction shift registers or parallel data-handling shift registers. For one thing, it is somewhat easier to recognize a character as the character defining data serially shifts through a register, and therefore I have elected to illustrate a conventional serial shift register in FIGURES 5–6*a*. The register 70 can be of any known kind such as a flip flop, magnetic core, etc. type.

With my system of scanning, minor problems are introduced, and these are shown exaggerated in FIGURES 5 and 6. Both of these figures diagrammatically show a character "9" appearing in zones 1 and 2 of the scan field, but in different relative positions. The image of the "9" in FIGURE 5 is slightly higher than that in FIGURE 6. By following the numerical and alphabetic designations, these figures show precisely how the scan data will be loaded in the register when four scans numbered 1, 2, 3 and 4 are completed. Considering the first scan (1) of FIGURE 5, when the two scan elements 28, 28′ are at the top of the respective zones (positions 1*a* and 1*a′*), a "black" signal (1*a′*) is first loaded in the bottom of the first column of register 70 at the time of the first clock pulse, followed by another "black" (position 1*b′*) at the next clock pulse, followed by a "white" pulse (position 1*c* and/or 1*c′*) and successively followed by "black" signals for positions 1*d*, 1*e*, 1*f* and 1*g*. Then the second scan (2) starts and the information gathered during the second scan is serially loaded into the first column of register 70, causing the data already stored therein to enter the second column. This procedure repeats for each scan trace. The positional information and data are designated for the second, third and fourth scans in FIGURE 5. Although the image of the unknown character "9" is shown stationary and successive scans 1, 2, 3 and 4 are shown adjacent to each other, it is understood that this is for illustrative purposes only, and that the scan lines or traces will be produced colinearly as shown in FIGURE 1 or FIGURE 4. Area coverage is due to the rotation of the disc providing one component of scan motion and the horizontal movement of the character image providing the other component of scan motion.

When the register is completely loaded, as shown in FIGURE 5, "Scan 4," there will be a space between the stored data (*a′*, *b′*) defining the lower tail of the "9" and the data defining the rest of the "9." By serially shifting the register two additional steps (as though two zeros or "whites" were inserted at the bottom of the first column of the shift register) the data in the register will be arranged as shown to the right of FIGURE 5, marked "Positioned." Now the data is oriented the same as the image of the character to the left of FIGURE 5, but it is horizontally "sheared" (horizontal displacement of some of the stored data). This would present no problem if the character were always "sheared' 'in the same place because the geometrical figure shown to the right of FIGURE 5 could be recognized as the character "9." However, the location of the "shear line" is a function of the vertical position of the unknown character in the scan area. For instance, if the unknown character "9" appeared a little lower (FIGURE 6), the character will be sheared in a different place as shown to the right of FIGURE 6. To rearrange the stored data so that it appears as in the part FIGURE 6 marked "Positioned" rather than in FIGURE 6 marked "Scan 4," four additional stepping pulses are required. The two additional shift pulses required in FIGURE 5 and the four additional shift pulses required in FIGURE 6 are easily reconciled because I use a serial shift register, and as the register continues to be loaded from the left end (load line 68), the data will "ripple" through the positions shown in FIGURES 5 and 6 as new data is continually loaded into the register.

If scanning resolution is made reasonably fine for this type of scanning system instead of a resolution of only four scans per character as shown in FIGURES 5 and 6, the shear in the character image (which is actually a slight shifting of the stored scan-data) does not present a formidable problem. For example, FIGURE 6*a* shows the same character "9" scanned with twelve vertical scans. By following the numerical and alphabetic indications for each clocked point in the twelve vertical scans, the serial register 70 will be completely loaded upon completion of the scanning of the character "9" as shown in the register 70 immediately to the right of the scan area. Then, when thirteen additional pulses are applied to the register over load line 68, the data will be rearranged in the register 70 as shown to the right of FIGURE 6*a*, whereby a truer picture of the stored data is seen. When using a resolution of about twenty vertical scans for each character, the condition is very greatly improved and the character quite easily recognized by an ordinary comparator or absolute type of decision section 72 of a reading machine.

A further improvement in the above condition can be made by having the unknown character (or its image or the scan traces) slightly skewed while it is being scanned. Because the vertical position of the unknown character in the total scan area (and thus the location of the horizontal shear in the register) will be an unknown, and for other reasons, this technique merely reduces the problem and does not provide a complete solution, as for example, does the embodiment of FIGURE 7, described later. When a character is located completely in one zone, there will be no horizontal shear in the stored data. Thus, at best the angle of skew will have to be a compromise.

As mentioned before, the serial handling of data in the temporary storage (register) of a reading machine provides several advantages over other techniques of temporary storage. For instance, the decision section of the reading machine need not be gated on at any precise instant. It may continually examine the data as it ripples through the register and when a character is recognized, the character-identity signal yielded. Further, a serial type of shift register is somewhat simpler and less expensive than bi-directional shift registers. Notwithstanding this, should one wish to practice my invention of tall scanning areas with a requirement of a much smaller capacity register of the bi-directional type, a system along the lines of FIGURE 7 may be used. In this figure there is no horizontal shear (displacement of character data in the register). I have a bi-directional register 70*a* with an additional, preceding column 71 into which the scan-data is serially gated via load line 68*a* just as in register 70. The columns of the register are serially interconnected (shown by dotted lines) so that the register 70a in this respect is identical to the register 70 shown, for instance in FIGURES 5 and 6. In addition, I have shown the register columns (except column 71) with feed back lines 90; in effect forming additional parallel paths made operative when shift pulses are available on shift signal line 92. The serial connection of the register columns together with the feed back lines 90 represent a conventional bi-directional shift register which operates serially until shift pulses occur (on line 92) at which the data in the individual columns is "rolled over" (fed back in the individual columns over lines 90). The same effect can be obtained by using a pure serial register plus simple gating in lines 90 and the inter-column connecting lines, which responds to the shift signals on line 92.

The embodiment of FIGURE 7 operates in this way: when the register is serially loaded exactly as in FIGURE 6, the information will appear in the register as shown in FIGURE 7a (same as the "Scan 4" position of FIGURE 6). Due to the extra column 71 (or preceding) the shift register 70a, column 71 will appear completely "white" (e.g., loaded with zeros) when the space between adjacent characters (e.g., on document 10, FIGURE 1) is scanned. A signal representing this condition will occur on line 94 which is the output of a coincidence AND gate 96, because the input lines 97 of this gate are connected to the respective stages of column 71. The signal on line 94 operates a pulse burst generator 98 which provides a serial train of pulses on line 100 to operate a ring counter or shift register 102 whose respective stages have lines 104 connected thereto. All of the lines 104 are OR gated at 106, and the output line from the OR gate is the previously mentioned shift pulse line 92. Thus, when the register 70a is loaded as shown in FIGURE 7a, a succession of pulses occurs on line 92 to shift out the data in the individual columns of register 70a and feed the data back over lines 90 so that during this shifting, the data wil be rearranged in the register exactly correctly without horizontal shear, as shown in FIGURE 7b. From this point on, the embodiment of FIGURE 7 can be the same as that of FIGURE 1, or I can use the shift pulses on line 92 to gate on the decision section of the reading machine by providing "read now" pulses to the decision section (e.g., as Patent No. 3,104,369). The effect would be for the decision section to interrogate the register for each of the new shifted positions between FIGURES 7a and 7b. When a character identity is made, a signal can be fed back from the decision section to clear the register 70a or as shown, I can use a signal from the last stage of counter 102 (conducted on delay line 110 to reset all stages of the shift register) for the same purpose.

It is understood that various changes and modifications may be made without departing from the protection of the following claims.

I claim:

1. A scanning system for devices in which it is desirable to store scan data and where the pattern that is scanned may occupy any vertical position in an area which is at least two times the height of the pattern, said scanning system including means to form an image of said area in an image plane, individual photosensitive means optically aligned with vertically adjacent zones of said image area, scanning means having means forming scan elements which vertically traverse said area in said image plane, said scan elements being so spaced that more than one colinear scan element concurrently traverses said vertically adjacent zones of said area so that while one element is traversing one zone another element is traversing another zone, the sum of said colinear elements defining a scan line, said individual photosensitive means for each zone providing concurrent scan-data outputs for each zone, and combining means to combine said outputs and provide scan data signals which are composites of said colinear scan elements signals for each scan line, whereby said scan data signals are compressed to correspond to approximately the height of one zone fitted to the position of the pattern even though the pattern may be partly positioned in two adjacent zones.

2. The scanning system of claim 1 wherein said scanning means include an apertured scanning disc.

3. In an optical character recognition machine having a register, the improvement comprising a scan system to examine a scan area which is at least twice as tall as the character but which requires a register capacity corresponding to the height of the character regardless of the vertical position of the character in said area, said system including a mechanical scanning device having means forming a plurality of scan elements which traverse said area as said device rotates, a plurality of photocells, each photocell being associated with a portion of said area so that the combined photocell area portions make up the total scan area, said scan elements being so spaced that a scan element is concurrently present in each area portion and a plurality of said elements traversing said area portions define a single scan line covering the vertical dimension of said area, clock means to sample each photocell output during a single scan line and provide scan data signals for said register, means to combine said scan data signals and provide a scan line signal with a bandwidth compression to the character area in said scan area, and means to load successive scan line signals into said register to thereby store a set of signals forming a stored representation of the character.

4. The reading machine of claim 3 wherein said register is a serial shift register and said stored representation of the scanned character is composed of individual character fragment representations which are sheared along a line whose location is determined by the proportion of the scanned character disposed in the respective area portions and by said combining means, and means to eliminate the shear between said representation fragments by shifting the register in a columnar feed-back mode.

5. In a character reading machine for characters on an area taller than the character and whereon the character may be located at an undetermined vertical position on said area, scanning means to examine said area by vertically adjoining zones thereof, said scanning means concurrently examining said vertically adjoining zones and providing concurrent output signals signifying the detection of a part of the character when detected in any of said zones, combining means for the signals resulting from examination of all of said zones including the condition when the character is located in part in more than one zone, a serial register, means to load the register with said signals to provide a representation of the character in the register by the set of stored signals, said character representation as stored being made of individual representation portions sheared along a line at an indeterminate position between opposite ends of the character owing to the bandwidth compression of said signals due to said combining means and owing to the unknown location of the scanned character relative to said zones, means operatively connected with said register for eliminating the shear between said character representation portions, said shear eliminating means including means to provide a control signal in response to full occupancy of the character representation in said serial register, and means responsive to said control signal to shift the stored set of signals in said register in a columnar feed-back mode.

References Cited by the Examiner

UNITED STATES PATENTS

| | | | |
|---|---|---|---|
| 2,131,911 | 10/38 | Ayres | 340—146.3 |
| 3,105,956 | 10/63 | Greanias | 340—146.3 |

MALCOLM A. MORRISON, *Primary Examiner.*